United States Patent
Johnson et al.

(12) 
(10) Patent No.: US 10,662,903 B2
(45) Date of Patent: May 26, 2020

(54) WASTE HEAT RECOVERY AND BOOST SYSTEMS INCLUDING VARIABLE DRIVE MECHANISMS

(71) Applicant: AVL Powertrain Engineering, Inc., Plymouth, MI (US)

(72) Inventors: Gustav R. Johnson, Canton, MI (US); Gary L. Hunter, Brighton, MI (US); Julian Sherborne, Novi, MI (US)

(73) Assignee: AVL Powertrain Engineering, Inc., Plymouth, MI (US)

( * ) Notice: Subject to any disclaimer, the term of this patent is extended or adjusted under 35 U.S.C. 154(b) by 715 days.

(21) Appl. No.: 15/050,847

(22) Filed: Feb. 23, 2016

(65) Prior Publication Data

US 2016/0252053 A1   Sep. 1, 2016

Related U.S. Application Data

(60) Provisional application No. 62/121,930, filed on Feb. 27, 2015, provisional application No. 62/121,973, (Continued)

(51) Int. Cl.
| | | |
|---|---|---|
| *F02M 26/04* | (2016.01) | |
| *F02B 41/10* | (2006.01) | |
| *F02B 37/04* | (2006.01) | |

(52) U.S. Cl.
CPC ............ *F02M 26/04* (2016.02); *F02B 37/04* (2013.01); *F02B 41/10* (2013.01); *Y02T 10/16* (2013.01); *Y02T 10/163* (2013.01)

(58) Field of Classification Search
CPC . F02C 6/12; F02M 26/04; Y02T 10/16; Y02T 10/163
(Continued)

(56) References Cited

U.S. PATENT DOCUMENTS

| 2,173,595 A | 9/1939 | Schutte |
| 2,585,968 A | 2/1952 | Schneider |

(Continued)

FOREIGN PATENT DOCUMENTS

| DE | 2052501 A1 | 5/1971 |
| DE | 3710195 A1 | 10/1987 |

(Continued)

OTHER PUBLICATIONS

European Office Action for Application No. 16157548.5 dated Mar. 7, 2017.

(Continued)

*Primary Examiner* — Thai Ba Trieu
*Assistant Examiner* — Dapinder Singh
(74) *Attorney, Agent, or Firm* — Harness, Dickey & Pierce, P.L.C.

(57) ABSTRACT

A powertrain system is provided and may include a combustion engine, a crankshaft, and a turbo-compounding system. The combustion engine may include an intake manifold and an exhaust manifold. The crankshaft may be driven by the engine. The turbo-compounding system may be configured to drive the crankshaft and may include a first turbine and a drive system. The first turbine may include an inlet fluidly communicating with the exhaust manifold. The drive system may include an input shaft driven by the first turbine, and an output shaft engaged with the crankshaft. The drive system may be configured to drive the output shaft at more than one drive ratio relative to the input shaft.

22 Claims, 1 Drawing Sheet

Related U.S. Application Data filed on Feb. 27, 2015, provisional application No. 62/126,088, filed on Feb. 27, 2015, provisional application No. 62/121,788, filed on Feb. 27, 2015.

(58) Field of Classification Search
USPC .................................................. 60/614, 624
See application file for complete search history.

(56) References Cited

U.S. PATENT DOCUMENTS

| | | | |
|---|---|---|---|
| 3,007,302 A | | 11/1961 | Vincent |
| 3,807,168 A † | | 4/1974 | Bachmann |
| 4,452,043 A * | | 6/1984 | Wallace ................. F02B 33/36 60/600 |
| 4,694,654 A * | | 9/1987 | Kawamura ........... F02B 37/005 290/52 |
| 4,815,282 A * | | 3/1989 | Wilkinson ............ F02B 37/001 60/247 |
| 5,429,078 A † | | 7/1995 | Tanigawa |
| 5,653,108 A † | | 8/1997 | Hope |
| 5,857,336 A † | | 1/1999 | Paul |
| 6,655,142 B2 * | | 12/2003 | Callas ..................... F02B 39/04 60/612 |
| 8,127,544 B2 * | | 3/2012 | Schwiesow ............. F02B 25/08 123/46 E |
| 8,495,877 B2 * | | 7/2013 | Weyer .................... F02B 33/34 60/624 |
| 8,528,331 B2 * | | 9/2013 | Lofgren ................ F02B 37/105 123/559.1 |
| 9,664,105 B2 * | | 5/2017 | Alfano .................... F02B 39/04 |
| 10,036,344 B2 | | 7/2018 | McClearen et al. |
| 10,072,562 B2 | | 9/2018 | Hunter et al. |
| 2007/0137626 A1 * | | 6/2007 | Turner ................... F02B 33/34 123/559.1 |
| 2009/0241540 A1 | | 10/2009 | Robel |
| 2010/0011763 A1 | | 1/2010 | Komatsu |
| 2010/0095672 A1 | | 4/2010 | An |
| 2010/0199666 A1 | | 8/2010 | VanDyne et al. |
| 2012/0090319 A1 | | 4/2012 | Mond et al. |
| 2012/0109491 A1 | | 5/2012 | Panciroli |
| 2012/0192559 A1 † | | 8/2012 | Liamboeck |
| 2013/0125544 A1 | | 5/2013 | Mond et al. |
| 2014/0020380 A1 * | | 1/2014 | Thomassin ............... F02C 6/20 60/605.1 |
| 2014/0331656 A1 † | | 11/2014 | Nagar |
| 2014/0373816 A1 | | 12/2014 | Nagar |
| 2016/0252009 A1 | | 9/2016 | Hunter et al. |

FOREIGN PATENT DOCUMENTS

| | | | |
|---|---|---|---|
| DE | 4128642 A1 | | 3/1993 |
| DE | 4429855 C1 | | 8/1995 |
| DE | 102005003714 A1 | | 8/2006 |
| DE | 102013000495 B3 | | 3/2014 |
| DE | 102013001231 A1 | | 7/2014 |
| EP | 0048027 A2 | | 3/1982 |
| GB | 479727 | † | 2/1938 |
| GB | 561428 | † | 5/1944 |
| GB | 561942 | † | 6/1944 |
| GB | 820096 A | | 9/1959 |
| GB | 2080432 A | | 2/1982 |
| JP | S59211720 A | | 11/1984 |
| WO | 2011011019 A1 | | 1/2011 |
| WO | 2013091669 A1 | | 6/2013 |
| WO | WO-2013126347 A1 | | 8/2013 |

OTHER PUBLICATIONS

Extended European Search Report for Application No. 16157548.5 dated Jul. 29, 2016.
Extended European Search Report for Application No. 16157542.8 dated Jul. 28, 2016.
Extended European Search Report dated Oct. 7, 2019 corresponding to European Patent Application 19188205.9, 7 pages.

\* cited by examiner
† cited by third party

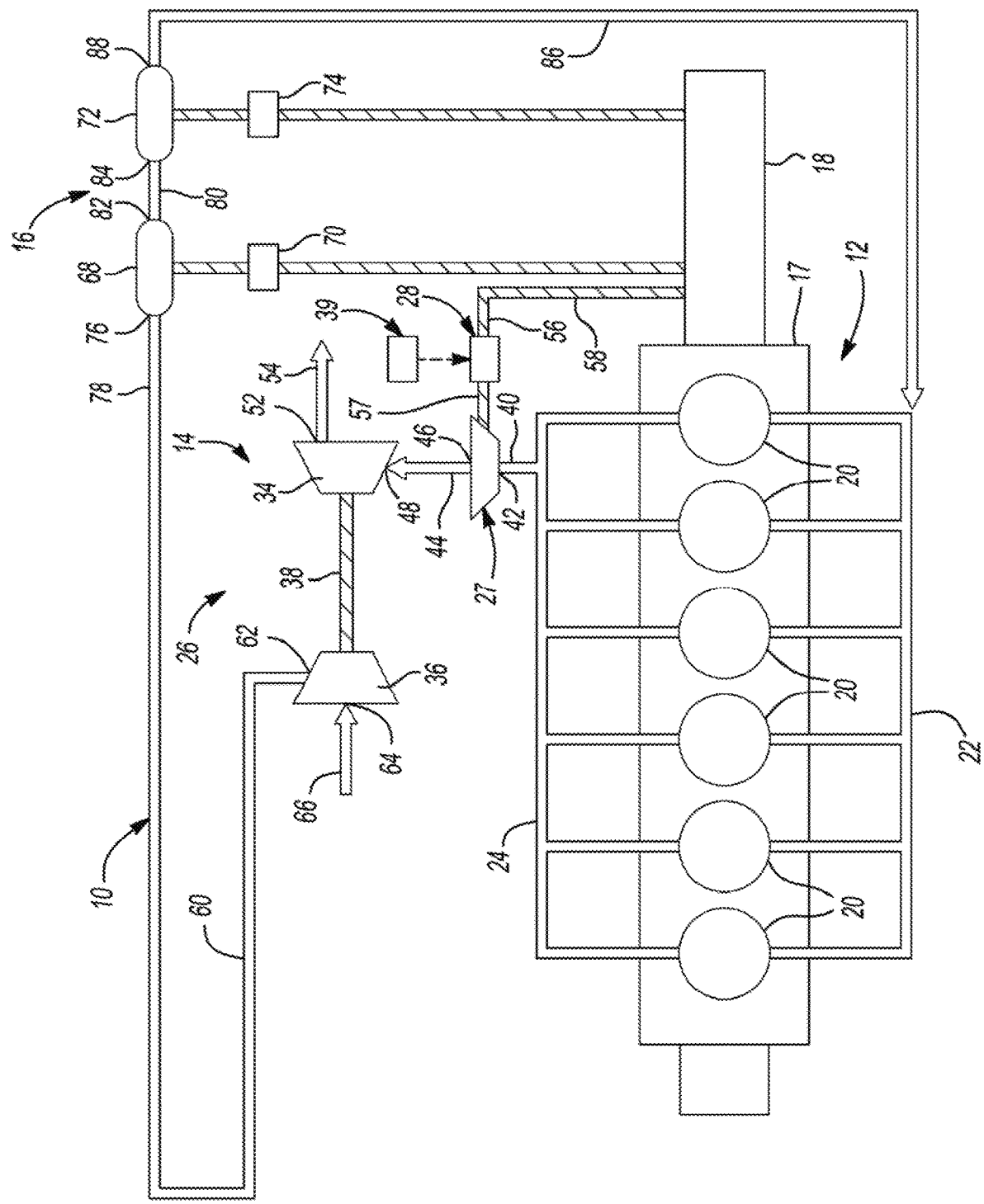

WASTE HEAT RECOVERY AND BOOST SYSTEMS INCLUDING VARIABLE DRIVE MECHANISMS

CROSS-REFERENCE TO RELATED APPLICATIONS

This application claims the benefit of U.S. Provisional Application No. 62/121,973, filed on Feb. 27, 2015, U.S. Provisional Application No. 62/121,930, filed on Feb. 27, 2015, U.S. Provisional Application No. 62/126,088, filed on Feb. 27, 2015, and U.S. Provisional Application No. 62/121,788, filed on Feb. 27, 2015. Furthermore, this application is related to U.S. application Ser. No. 15/050,877, filed on Feb. 23, 2016. The entire disclosures of each of the above applications are incorporated herein by reference.

FIELD

The present disclosure relates to opposed piston engines, and more particularly to an opposed piston engine having a waste heat recovery and/or boost systems including a variable drive mechanism.

BACKGROUND

This section provides background information related to the present disclosure and is not necessarily prior art.

Turbochargers and superchargers can be used to increase the efficiency and/or power output of an engine. A turbo-compounding system having an additional turbine downstream of the turbocharger can be employed to transmit energy from engine exhaust gas to a crankshaft of the engine to further increase the fuel efficiency of the engine. While traditional turbo-compounding systems have improved engine fuel efficiency, these improvements have been limited to a relatively narrow range of engine operating conditions.

SUMMARY

This section provides a general summary of the disclosure, and is not a comprehensive disclosure of its full scope or all of its features.

The present disclosure provides a powertrain system. The powertrain system may include a combustion engine, a crankshaft, and a turbo-compounding system. The combustion engine may include an intake manifold and an exhaust manifold. The crankshaft may be driven by the engine. The turbo-compounding system may be configured to drive the crankshaft and may include a first turbine and a drive system. The first turbine may include an inlet fluidly communicating with the exhaust manifold. The drive system may include an input shaft driven by the first turbine, and an output shaft engaged with the crankshaft. The drive system may be configured to drive the output shaft at more than one drive ratio relative to the input shaft.

In some configurations, the drive system is configured to drive the output shaft at more than one drive ratio relative to the input shaft.

In some configurations, the powertrain system includes a control module in communication with the drive system. The control module may operate the drive system at a desired gear ratio.

In some configurations, the powertrain system includes a turbocharger having an inlet in fluid communication with an outlet of the first turbine.

In some configurations, the turbocharger includes a second turbine and a compressor. The second turbine may be in fluid communication with the first turbine and drivingly engaged with the compressor. The compressor may include an outlet fluidly communicating with a supercharging system.

In some configurations, the powertrain system includes a supercharging system driven by the crankshaft. The supercharging system may include a first drive system and a first compressor. The first drive system may be driven by the crankshaft and configured to drive the first compressor.

In some configurations, the first drive system is configured to drive the first compressor at various drive ratios.

In some configurations, the supercharging system includes a second drive system and a second compressor. The second drive system may be driven by the crankshaft and configured to drive the second compressor.

In some configurations, the first compressor includes a first inlet and a first outlet. The second compressor may include a second inlet and a second outlet. The first outlet may fluidly communicate with the second inlet.

In some configurations, the first inlet may be in fluid communication with the turbo-compounding system.

In some configurations, the powertrain system may be configured without at least one of an exhaust gas regeneration system and a charge air cooling system.

In some configurations, the powertrain system may be configured without an exhaust gas regeneration system and without a charge air cooling system.

The present disclosure also provides a powertrain system including a combustion engine, a crankshaft, and a supercharging system. The combustion engine may include an intake manifold and an exhaust manifold. The crankshaft may be driven by the engine. The supercharging system may be driven by the crankshaft and may include a first drive system and first and second compressors. The first drive system may be driven by the crankshaft and may be configured to drive at least one of the first and second compressors. The first compressor may include a first inlet and a first outlet. The second compressor may include a second inlet and a second outlet. The first outlet may fluidly communicate with the second inlet.

In some configurations, the first drive system is configured to drive the first and second compressors at more than one drive ratio.

In some configurations, the powertrain system includes a second drive system driven by the crankshaft and configured to drive one of the first and second compressors. The first drive system is configured to drive the other of the first and second compressors.

In some configurations, the powertrain system includes a turbo-compounding system configured to drive the crankshaft. The turbo-compounding system may include a turbine and a third drive system. The turbine may include an inlet fluidly communicating with the exhaust manifold. The third drive system may include an input shaft driven by the turbine, and an output shaft engaged with the crankshaft.

In some configurations, the powertrain system includes a control module in communication with the first, second and third drive systems. The control module may control the gear ratios of the first, second and third drive systems.

In some configurations, the drive system is configured to drive the output shaft at more than one drive ratio relative to the input shaft.

In some configurations, the powertrain system is configured without at least one of an exhaust gas regeneration system and a charge air cooling system.

In some configurations, the powertrain system is configured without an exhaust gas regeneration system and without a charge air cooling system.

The present disclosure also provides a powertrain system having a supercharging system and a turbo-compounding system. The supercharging system may include a first drive system and first and second compressors. The first drive system may be configured to be driven by a crankshaft of an engine and may be further configured to drive at least one of the first and second compressors. The first compressor may include a first inlet and a first outlet. The second compressor may include a second inlet and a second outlet. The first outlet may fluidly communicate with the second inlet. The turbo-compounding system may include a second drive system and a turbine. The second drive system may include an input shaft driven by the turbine and a output shaft drivingly engaged with the crankshaft.

In some configurations, the supercharging system includes a third drive system. The first drive system is configured to drive one of the first and second compressors, and the third drive system is configured to drive the other of the first and second compressors.

In some configurations, the first and second drive systems are configured to drive the at least one of the first and second compressors and the crankshaft, respectively, at various drive ratios.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic representation of an engine including a variably driven turbo-compounding system and a scavenging system according to the principles of the present disclosure.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a powertrain system 10 is provided and may include an engine 12, a turbo-compounding system 14, and a scavenging or supercharging system 16. In various implementations, certain systems and/or components may be omitted from the system 10. For example, the powertrain system 10 may include only the engine 12 and the turbo-compounding system 14, and not the supercharging system 16. Conversely, the powertrain system 10 may include only the engine 12 and the supercharging system 16, and not the turbo-compounding system 14. The engine 12 may be any type of combustion engine such as a diesel engine or a spark-ignition engine, for example, and may include an engine block 17 and a crankshaft 18. The engine block 17 may include one or more cylinders 20 in which one or more pistons (not shown) reciprocate to drive the crankshaft 18. The cylinders 20 may be in selective fluid communication with an intake manifold 22 and an exhaust manifold 24. The cylinders 20 may receive air (or a mixture of air and fuel) from the intake manifold 22 for combustion in the cylinders 20. Exhaust gas may be discharged from the cylinders 20 into the exhaust manifold 24 prior to flowing into the turbo-compounding system 14. While the engine 12 is described above as being a piston-driven engine, the engine 12 could be any other type of engine, such as a Wankel engine, for example.

The turbo-compounding system 14 may include a turbocharger 26, a turbine 27, and a variable speed transmission or drive system 28. As illustrated, the turbo-compounding system 14 may be constructed without an exhaust gas recirculation loop or system. Specifically, as will be described below, all of the exhaust gas produced by the engine 12, or otherwise flowing through the exhaust manifold 24, may flow through the exhaust system (not shown) without reentering, or otherwise flowing into, the engine 12.

The turbocharger 26 may include a turbine 34 and a compressor 36. The turbine 34 may include a radial, axial or mixed-flow-type turbine. In some configurations, the turbine 34 and the compressor 36 may be connected to a first shaft 38 for rotation therewith. In other configurations, the turbocharger 26 may be constructed without compressor 36, and thus without the first shaft 38.

The drive system 28 may be located between the turbine 27 and the engine 12. In this regard, as will be discussed in more detail below, the drive system 28 may couple turbine 27 to the crankshaft 18. The drive system 28 can include various configurations of a multi or variable speed drive system. In some configurations the drive system 28 may be configured to produce a continuously variable drive or gear ratio. In other configurations, the drive system 28 may be configured to produce multiple, discrete drive or gear ratios.

In some configurations the drive system 28 may include a continuously variable transmission. In other configurations the drive system 28 may include a stepwise transmission (e.g., a gear box transmission having an epicyclic or other suitable gear train). In this regard, a control module 39 may be in communication with the drive system 28 and may control the operation of the drive system 28 based on one or more operating parameters of the engine 12 and/or the turbo-compounding system 14. For example, the control module 39 may control or otherwise select a desired transmission or gear ratio of the drive system 28 based on an angular velocity and/or torque of the crankshaft 18. While the control module 39 is shown as a control module dedicated to the turbo-compounding system 14, including the drive system 28, it will be appreciated that the control module 39 may be a part of or include a control module (not shown) controlling one or more other vehicle systems (not shown).

The drive system 28 can be configured to transmit energy from exhaust gas in the exhaust manifold 24, and from the turbine 27, to the crankshaft 18. In this regard, a first fluid passageway 40 may extend between and fluidly communicate with the exhaust manifold 24 and an inlet 42 of the turbine 27. A second fluid passageway 44 may extend between and fluidly communicate with an outlet 46 of the turbine 27 and an inlet 48 of the turbine 34. The turbine 34 may include an outlet 52 in fluid communication with a third fluid passageway 54. The third fluid passageway 54 may include, or fluidly communicate with, a vehicle's exhaust system (not shown).

The angular velocity of an output shaft 56 of the drive system 28, including an angular velocity of the crankshaft 18, can differ from an angular velocity of an input shaft 57 of the drive system 28. Specifically, exhaust gas flowing through the first fluid passageway 40 can drive the turbine 27 and the input shaft 57 of the drive system 28 at the first angular velocity. The input shaft 57 of the variable drive system 28 may be coupled to the output shaft 56 via the drive system 28, such that the drive system 28 can drive the output shaft 56 at the second angular velocity, different than the first angular velocity. A further discussion of a suitable drive system 28, including various configurations and functions thereof, may be found in commonly owned U.S. Provisional Patent Application No. 62/121,768 entitled "Variable Drive for Liquefied Natural Gas Pump," where the input shaft 57 is found and described at reference numeral 40, the output shaft 56 is found and described at reference numeral 42, and the drive system 28 is found and described at reference numeral 32. The entire disclosure of U.S. Provisional Patent Application No. 62/121,768 is hereby incorporated by reference in its entirety.

The second or output shaft 56 may be coupled to the crankshaft 18 of the engine 12 via a transmission device 58. The transmission device 58 may transmit rotary power from the output shaft 56 to the crankshaft 18. The transmission device 58 may include a belt and pulleys, a chain and sprockets, a system of gears, hydraulic lines and pistons, an electric variable transmission, a clutch and/or any other device or system capable of transferring rotary power from the output shaft 56 to the crankshaft 18.

As will be described in more detail below, in some configurations a fourth fluid passageway 60 may extend between and fluidly communicate with an outlet 62 of the compressor 36 and a portion of the supercharging system 16. An inlet 64 of the compressor 36 may be in fluid communication with a fluid source 66. The fluid source 66 may include a source of air (e.g., an ambient environment; not shown) and/or a nitrous-oxide tank (not shown), for example. As discussed above, in other configurations, the turbocharger 26 may be constructed without the fourth fluid passageway 60 and the compressor 36.

The supercharging system 16 may include the first compressor 68, a first drive system 70, a second compressor 72, and a second drive system 74. As will be described in more detail below, the first compressor 68 and the first drive system 70 may be arranged in parallel with, and relative to, the second compressor 72 and the second drive system 74. While the supercharging system 16 is shown and described herein as having two compressors and two drive systems in a parallel arrangement, it will be appreciated that the supercharging system 16 may include more than two compressors and more than two drive systems in a parallel arrangement within the scope of the present disclosure.

The first and/or second compressors 68, 72 may include a centrifugal, axial or positive displacement type compressor. A size of the first compressor 68 may differ from a size of the second compressor 72. Specifically, the first compressor 68 may include a first maximum air mass flow and/or pressure, and the second compressor 72 may include a second maximum air mass flow and/or pressure that is different from the first maximum air mass flow and/or pressure. In some configurations, the first maximum air mass flow and/or pressure of the first compressor 68 may be greater than the second maximum air mass flow and/or pressure of the second compressor 72. In other configurations, the second maximum air mass flow and/or pressure of the second compressor 72 may be greater than the first maximum air mass flow and/or pressure of the first compressor 68. The varying sizes of the first and second compressors 68, 72, or the more than two compressors, can allow for efficient operation of the supercharger system 16 at varying speeds and loads of the engine 12. For example, as will be explained in more detail below, in a high speed and/or high load environment, the larger of the first and second compressors 68, 72 can be engaged with the crankshaft 18 via the respective one of the first and second drive systems 70, 74, and the smaller of the first and second compressors 68, 72 can be disengaged from the crankshaft 18 via the respective other one of the first and second drive systems 70, 74. In a low speed and/or low load environment, the smaller of the first and second compressors 68, 72 can be engaged with the crankshaft 18 via the respective one of the first and second drive systems 70, 74, and the larger of the first and second compressors 68, 72 can be disengaged from the crankshaft 18 via the respective other one of the first and second drive systems 70, 74. Since a smaller compressor, as compared to a larger compressor, places less load on an engine, engaging the smaller of the first and second compressors 68, 72 at low speeds and/or low loads improves the efficiency of the supercharging system 16.

The first compressor 68 may include an inlet 76 in fluid communication with a fluid source 78. The fluid source 78 may include a source of air (e.g., an ambient environment; not shown) and/or a nitrous-oxide tank (not shown), for example. As illustrated, in some configurations the fluid source 78 may include the fourth fluid passageway 60 in fluid communication with the outlet 62 of the compressor 36. A fifth fluid passageway 80 may extend between and fluidly communicate with an outlet 82 of the first compressor 68 and an inlet 84 of the second compressor 72. A sixth fluid passageway 86 may extend between and fluidly communicate with an outlet 88 of the second compressor 72 and the intake manifold 22. As illustrated, the supercharging system 16 may be constructed without a charge air cooler. In this regard, air may flow from the first compressor 68 to the second compressor 72, and from the second compressor 72 to the intake manifold 22, without flowing through a cooling device or system. Accordingly, a temperature of the air flowing into the intake manifold 22 may be substantially equal to a temperature of the air flowing out of the first and/or second compressors 68, 72.

The supercharging system 16 is configured to transmit energy from the crankshaft 18 to the first compressor 68 and/or the second compressor 72. In this regard, the first and second compressors 68, 72 may be connected to the crankshaft 18 of the engine 12 via the first and second drive systems 70, 74. The first and second drive systems 70, 74 may transmit rotary power from the crankshaft 18 to the first and second compressors 68, 72. In some configurations the first and/or second drive systems 70, 74 may include a belt and pulleys, a chain and sprockets, a system of gears, hydraulic lines and pistons, an electric variable transmission, a clutch and/or any other device or system capable of transferring rotary power from the crankshaft 18 to the first and/or second compressors 68, 72, respectively. In other configurations, the first and/or second drive systems 70, 74 may include various configurations of a multi or variable speed drive system. In this regard, the first and/or second drive systems 70, 74 may be configured to produce a continuously variable ratio or multiple, discrete ratios. In some configurations the first and/or second drive systems 70, 74 may include a continuously variable transmission. In other configurations the first and/or second drive systems 70, 74 may include a stepwise transmission (e.g., a gear box transmission having an epicyclic or other suitable gear train).

While each of the first and second compressors 68, 72 is shown with a corresponding one of the first and second drive systems 70, 74, both of the first and second compressors 68, 72 may be coupled to one of the first and second drive system 70, 74. In such implementations, the one of the first and second drive systems 70, 74 that is not coupled to the first and/or second compressor 68, 72 may be omitted. In implementations where each of the first and second compressors 68, 72 is coupled to a corresponding one of the first and second drive systems 70, 74, such as shown in FIG. 1, the first and/or second drive systems 70, 74 can be configured, or otherwise coupled to the crankshaft 18, such that each of the first and second compressors 68, 72 can be operated independently of the other of the first and second compressors 68, 72. For example, in some configurations or modes of operation, the first drive system 70 can be disengaged from the crankshaft 18 while the second drive system 74 is engaged with the crankshaft 18. In other configurations or modes of operation, the second drive system 74 can be disengaged from the crankshaft 18 while the first drive system 70 is engaged with the crankshaft 18. In other configurations, both of the first and second drive systems 70, 74 can be engaged with the crankshaft 18. In configurations that include more than two drive systems, as discussed above, one or more of the more than two drive systems can be disengaged from the crankshaft 18, while one or more of the more than two drive systems can be engaged with the crankshaft 18.

With continued reference to the FIG. 1, operation of the powertrain system 10 will be described in detail. During operation of the engine 12, fluid from the intake manifold 22 may be drawn into one or more of the cylinders 20 for combustion therein. After combustion, exhaust gas may be discharged from the cylinders 20 to the exhaust manifold 24. The exhaust gas in the exhaust manifold 24 may flow into the first fluid passageway 40 and then may flow through the drive system 28 to rotate the input shaft of the drive system 28 at the first angular velocity. As the exhaust gas flows through the drive system 28 to rotate the input shaft, the actual gear ratio at which the drive system 28 operates may be varied, either continuously or between discrete gear ratios, such that the first angular velocity of the input shaft is different than the second angular velocity of the output shaft 56, as previously described herein. In this regard, a desired gear ratio may be provided to the drive system 28 by the control module 39. The desired gear ratio may correspond to one or more operating parameters of the engine 12, such as the angular velocity of the crankshaft 18 and/or the torque produced by the crankshaft 18, for example. If the actual gear ratio differs from the desired gear ratio, the control module 39 may communicate with, and control the operation of, the drive system 28 to increase or decrease the actual gear ratio until the actual gear ratio is equal to the desired gear ratio.

The transmission device 58 may transmit the rotational energy of the second shaft 56 to the crankshaft 18 of the engine 12. In this manner, the drive system 28 can drive the output shaft 56 of the turbine 34, and thus the crankshaft 18, at a desired speed or rotational velocity corresponding to the operating parameters of the engine 12, such that energy from the flow of exhaust gas may be transmitted to, and thus assist in driving, the crankshaft 18, thereby improving the fuel efficiency of the engine 12. Exhaust gas flowing through the first fluid passageway 40 may thereafter flow through the second and third fluid passageways 44, 54 and into the exhaust system.

Rotation of the turbine 34 may also cause the first shaft 38, and thus the compressor 36, to rotate. Rotation of the compressor 36 causes fluid from the fluid source 66 to enter the compressor 36 at a first pressure and exit the compressor 36 at a second pressure that is higher than the first pressure. The compressed fluid exiting the compressor 36 may flow through the fourth fluid passageway 60 to the intake manifold 22.

Rotation of the crankshaft 18 may also actuate, or otherwise rotate, the first and/or second drive systems 70, 74. Rotation of the first and/or second drive systems 70, 74 can, in turn, cause the first and/or second compressors 68, 72 to rotate. Rotation of the first compressor 68 causes fluid from the fluid source 78 to enter the inlet 76 at a first pressure and a first temperature and exit the outlet 82 of the first compressor 68 at a second pressure and a second temperature that are higher than the first pressure and the first temperature, respectively. The compressed fluid exiting the first compressor 68 may flow through the fifth fluid passageway 80 to the second compressor 72. Rotation of the second compressor 72 causes fluid from the fifth fluid passageway 80 to enter the inlet 84 of the second compressor 72 at a third pressure and a third temperature and exit the outlet 88 of the second compressor 72 at a fourth pressure and a fourth temperature that are higher than the third pressure and third temperature, respectively. The compressed fluid exiting the second compressor 72 may flow through the sixth fluid passageway 86 to the intake manifold 22.

As the first and second drive systems 70, 74 drive, or otherwise cause the rotation of, the first and/or second compressors 68, 72, the actual gear ratio at which the first and/or second drive systems 70, 74 operate may be varied, either continuously or between discrete gear ratios. In this regard, the control module 39 may operate the first and/or second drive systems 70, 74 at a desired gear ratio. The desired gear ratio may correspond to one or more operating parameters of the engine 12. The operating parameters can include a pressure and/or mass flow rate of air in the intake manifold 22, for example. If the actual gear ratio differs from the desired gear ratio, the control module 39 may communicate with, and control the operation of, the first and/or second drive systems 70, 74 to increase or decrease the actual gear ratio until the actual gear ratio is equal to the desired gear ratio. In this manner, the first and/or second drive systems 70, 74 can drive the first and/or second compressors 68, 72 at a desired speed or rotational velocity corresponding to the operating parameters of the engine 12.

The drive system 28 of the turbo-compounding system 14, and the first and second drive systems 70, 74 of the supercharging system 16, can allow the turbine 34 and the first and second compressors 68, 72 to rotate at different, or otherwise unique, angular velocities. In this regard, the angular velocities of the turbine 34 and the first and second compressors 68, 72 can be optimized in the manner described above, such that each of the turbine 34 and the first and second compressors 68, 72 has a different rotational velocity.

Varying, or otherwise controlling the gear ratio of the drive system 28, and thus the angular velocities of the turbine 34 and the crankshaft 18, can allow the turbo-compounding system 14 to supply an optimal amount of power to the crankshaft 18. Providing a supercharging system 16 having first and second drive systems 70, 74 and a parallel arrangement of compressors, including the first and second compressors 68, 72, can allow the first and second compressors 68, 72 to rotate at an optimal angular velocity with respect to the engine 12, and thereby allow the supercharging system 16 to supply an optimal flow (e.g., pressure, mass flow rate, etc.) of fluid to the intake manifold 22. Constructing the powertrain system 10, including the turbo-compounding system 14 and the supercharging system 16, without a charge air cooler and without an exhaust gas recirculation system, can reduce a cooling load of the engine 12. Reducing the cooling load of the engine 12 can in turn allow for a reduction in the size of the turbo-compounding system 14 and/or the supercharging system 16, which can thereby improve the fuel economy and efficiency of the engine 12 over a broader range of engine operating conditions. Reducing the cooling load of the engine 12 may also result in the engine 12 operating at a higher temperature. The higher operating temperature of the engine 12 associated with eliminating the charge air cooler and/or the exhaust gas recirculation can be addressed or otherwise handled via mechanisms described in U.S. Provisional Application No. 62/121,788; entitled Multi Injector Thermal Management System and Method) (e.g., the cylinder liner 14, the cylindrical ring 78, and the passage 108), and in U.S. Provisional Application No. 62/126,088; entitled "Opposed Piston Two Stroke Engine Liner Construction"), the entire disclosures of which are incorporated herein by reference.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A powertrain system comprising:
   a combustion engine including an intake manifold and an exhaust manifold;
   a crankshaft driven by the engine; and
   a turbo-compounding system configured to drive the crankshaft, the turbo-compounding system including a first turbine and a drive system, the first turbine having an inlet fluidly communicating with the exhaust manifold, the drive system having an input shaft driven by the first turbine, and an output shaft engaged with the crankshaft, the drive system configured to drive the output shaft at more than one drive ratio relative to the input shaft, the turbo-compounding system including a turbocharger having an inlet in fluid communication with an outlet of the first turbine.

2. The powertrain system of claim 1, further comprising a control module in communication with the drive system, the control module operating the drive system at a desired gear ratio.

3. The powertrain system of claim 1, wherein the turbocharger includes a second turbine and a compressor, the second turbine in fluid communication with the first turbine and drivingly engaged with the compressor, the compressor including an outlet fluidly communicating with a supercharging system.

4. The powertrain system of claim 1, further comprising a supercharging system driven by the crankshaft, the supercharging system including a first drive system and a first compressor, the first drive system being driven by the crankshaft and configured to drive the first compressor.

5. The powertrain system of claim 4, wherein the first drive system is configured to drive the first compressor at various drive ratios.

6. The powertrain system of claim 4, wherein the supercharging system includes a second drive system and a second compressor, the second drive system being driven by the crankshaft and configured to drive the second compressor.

7. The powertrain system of claim 6, wherein the first compressor includes a first inlet and a first outlet, and the second compressor includes a second inlet and a second outlet, the first outlet fluidly communicating with the second inlet.

8. The powertrain system of claim 7, wherein the first inlet is in fluid communication with the turbo-compounding system.

9. The powertrain system of claim 1, wherein the powertrain system is configured without at least one of an exhaust gas regeneration system and a charge air cooling system.

10. The powertrain system of claim 1, wherein the powertrain system is configured without an exhaust gas regeneration system and without a charge air cooling system.

11. A powertrain system comprising:
    a combustion engine including an intake manifold and an exhaust manifold;
    a crankshaft driven by the engine; and
    a supercharging system driven by the crankshaft, the supercharging system including a first drive system and first and second compressors, the first drive system being driven by the crankshaft and configured to drive the first compressor at more than one drive ratio, the first compressor including a first inlet and a first outlet, the second compressor including a second inlet and a second outlet, the first inlet fluidly communicating with the second outlet.

12. The powertrain system of claim 11, further comprising a second drive system driven by the crankshaft and configured to drive the second compressor.

13. The powertrain system of claim 12, wherein the second drive system is configured to drive the second compressor at more than one drive ratio.

14. The powertrain system of claim 11, further comprising a turbo-compounding system configured to drive the crankshaft, the turbo-compounding system including a turbine and a third drive system, the turbine having an inlet fluidly communicating with the exhaust manifold, the third drive system having an input shaft driven by the turbine, and an output shaft engaged with the crankshaft.

15. The powertrain system of claim 14, wherein the third drive system is configured to drive the output shaft at more than one drive ratio relative to the input shaft.

16. The powertrain system of claim 11, wherein the powertrain system is configured without at least one of an exhaust gas regeneration system and a charge air cooling system.

17. The powertrain system of claim 11, wherein the powertrain system is configured without an exhaust gas regeneration system and without a charge air cooling system.

18. A powertrain system comprising:
a supercharging system having a first drive system and first and second compressors, the first drive system configured to be driven by a crankshaft of an engine and configured to drive the first compressor at more than one drive ratio, the first compressor including a first inlet and a first outlet, the second compressor including a second inlet and a second outlet, the first inlet fluidly communicating with the second outlet; and
a turbo-compounding system including a second drive system and a turbine, the second drive system having an input shaft driven by the turbine and a output shaft drivingly engaged with the crankshaft.

19. The powertrain system of claim 18, wherein the supercharging system includes a third drive system configured to drive the second compressor.

20. The powertrain system of claim 19, wherein the third drive system is configured to drive the second compressor at more than one drive ratio.

21. The powertrain system of claim 18, wherein the first and second drive systems are configured to drive the first compressor and the crankshaft, respectively, at various drive ratios.

22. The powertrain system of claim 18, further comprising the engine.

* * * * *